(12) United States Patent
Hamilton et al.

(10) Patent No.: US 6,962,423 B2
(45) Date of Patent: Nov. 8, 2005

(54) MULTI-MODE SEARCHLIGHT

(75) Inventors: Scott E. Hamilton, North Lewisburg, OH (US); Craig E. Giffen, Hilliard, OH (US); Nicolo F. Machi, Urbana, OH (US); Scott R. Mangum, Dublin, OH (US); Saed S. Mubaslat, Miamisburg, OH (US); Charles A. Roudeski, Springfield, OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/231,216

(22) Filed: Aug. 30, 2002

(65) Prior Publication Data

US 2003/0086251 A1 May 8, 2003

Related U.S. Application Data

(60) Provisional application No. 60/332,793, filed on Nov. 6, 2001.

(51) Int. Cl.[7] .............................................. G03B 15/02
(52) U.S. Cl. ...................... 362/12; 362/553; 362/470; 362/544; 362/547; 362/548; 362/549; 362/228; 362/231; 362/240; 362/373; 362/800; 362/294; 362/259
(58) Field of Search ........................ 362/12, 553, 554, 362/470, 543, 544, 546, 547, 548, 549, 228, 231, 240, 269, 373, 428, 800, 230, 236, 247, 241, 294, 259, 8; 372/109

(56) References Cited

U.S. PATENT DOCUMENTS 3,641,261 A    2/1972  Chaplin et al.
4,115,841 A    9/1978  Alexander
4,513,356 A    4/1985  Mikola
4,760,506 A  * 7/1988  Mochizuki et al. ......... 362/548
5,589,901 A   12/1996  Means
5,695,272 A   12/1997  Snyder et al.
5,719,568 A    2/1998  Adams
6,250,783 B1 * 6/2001  Stidham et al. ............. 362/494
6,254,259 B1 * 7/2001  Kobayashi ................... 362/465
6,315,435 B1  11/2001  Hamilton et al.
6,461,029 B2 * 10/2002 Gronemeier et al. ........ 362/545
6,609,812 B2 * 8/2003  Machi et al. ................ 362/231
2001/0026452 A1 * 10/2001 Ganzer et al. ............. 362/470

FOREIGN PATENT DOCUMENTS

DE    36 22 025 C1    10/1987
DE    42 15 940 A1    11/1993
DE    42 42 331 A1     6/1994
WO    WO 00/37314 A1   6/2000
WO    WO 02/49916 A1   6/2002

* cited by examiner

Primary Examiner—Stephen Husar
Assistant Examiner—Sharon Payne
(74) Attorney, Agent, or Firm—Larry J. Palguta

(57) ABSTRACT

A multi-mode visible and infrared lighthead (100) for use as a landing light or searchlight. The multi-mode lighthead incorporates a modular design wherein at least one visible light source (200) and at least one infrared diode (302) are mounted into the rear sector (128) of a housing (102). Visible or infrared light is emitted out of the front sector (122) of the housing (102). Lenses (308) are installed onto the front sector (122) of the housing (102) and sealed to protect the interior of the lighthead (100) from the elements. Alternatively, and in combination, an imaging module (1), and infrared laser (400) and/or a fixed-position searchlight with rangefinder and positioning capability is provided in the multi-mode lighthead(100).

24 Claims, 14 Drawing Sheets

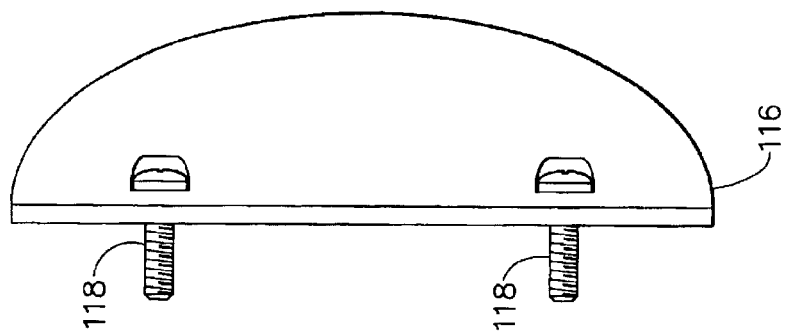
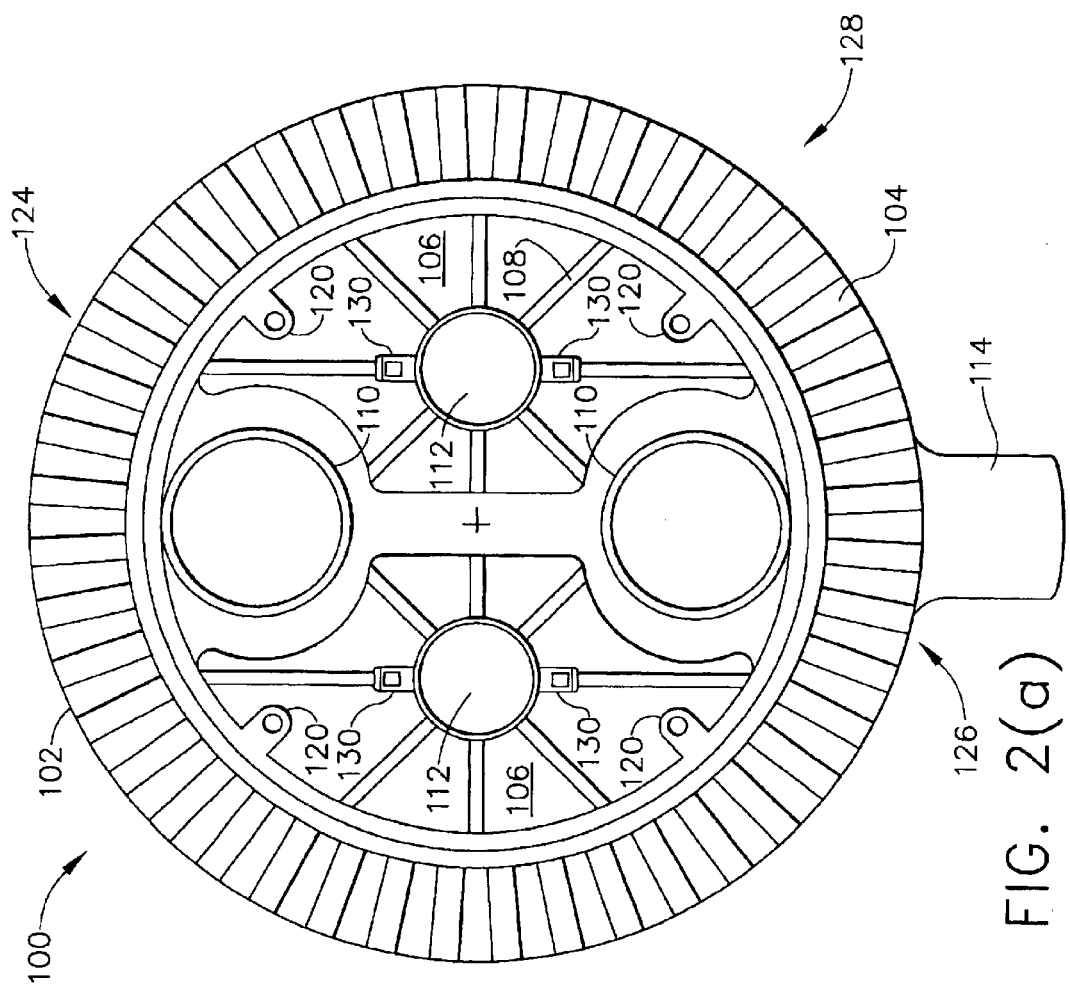

MULTI-MODE SEARCHLIGHT

CROSS-REFERENCES TO RELATED APPLICATIONS

This nonprovisional application claims the benefit of U.S. Provisional Application No. 60/332,793, filed on Nov. 6, 2001, the entirety of which is herein incorporated by reference.

TECHNICAL FIELD AND INDUSTRIAL APPLICABILITY OF THE INVENTION

The present invention is generally directed to a multi-mode searchlight, and more particularly to a multi-mode searchlight providing infrared, conventional, and/or other miscellaneous visual aids for an operator of a helicopter. Specifically, the present invention relates to a multi-mode visible and infrared lighthead for use with aircraft landing lights and searchlights, and for use with other vehicles and systems.

BACKGROUND OF THE INVENTION

The following discussion of the background art is a result of the present inventors analysis of the systems and features of searchlight technology of the background art. The present invention relates to limitations on a flight crew's ability to see areas outside the aircraft, such as areas that are blocked by the aircraft's structure. Aircraft generally have landing lights mounted thereon to provide illumination during taxi, take-off, and landing when visibility is reduced by darkness or adverse weather conditions.

Landing lights may be mounted in a fixed position on the aircraft. Alternatively, the landing lights may be pivotable by a drive unit or device to extend from the aircraft when needed, and retracted to reduce drag when not in use. Searchlights are pivotable by a drive device similar to landing lights, but include an additional capability to rotate up to 360 degrees in a plane perpendicular to the extend-retract plane. Military and law enforcement helicopters commonly use searchlights to aim a beam of light in a desired direction to illuminate targets.

With the advent of infrared based Night Vision Imaging Systems ("NVIS") for covert operations, a need has arisen for landing lights and searchlights that are compatible with NVIS by producing infrared light for illuminating the selected landing and search areas while eliminating visible light. Early NVIS-compatible landing and searchlights used infrared light filters installed over conventional visible lighting systems.

A disadvantage of early NVIS-compatible lighting systems was that the flight crew could not switch from visible to NVIS modes during a mission, since the infrared filters were required to be installed and removed while the aircraft was on the ground. This disadvantage was overcome by prior dual mode lightheads containing both visible and infrared lighting elements.

U.S. Pat. No. 5,695,272 to Snyder et al., the entirety of which is hereby incorporated by reference, describes an exemplary visible and infrared lighting element of the background art. Snyder et al. describes a lamp head having a visible light section and an infrared section. An operator is able to switch between infrared and visible light filaments controlled on a lamp head that may be extended, retracted and rotated through the use of relays and a mode selector switch.

Dual mode lightheads allow the flight crew to switch between visible and infrared lighting modes by simply applying electrical power to either the infrared or visible portions of the dual mode lighthead as desired. While prior dual mode lightheads offer significant advantages over early manually-installed filters, they suffer from several disadvantages. First, replacement of failed lamps is a cumbersome and difficult process owing to the segmented lens and filter assembly which must be removed and then re-sealed each time a lamp is replaced. This repair frequently causes damage to the reflectors, thereby reducing the optical efficiency of the lighthead.

In addition, dual mode lightheads typically emit lower light intensity than dedicated infrared or visible lighting systems, since the surface area on the lighthead available for the lighting system is divided between the visible and infrared portions. Further, prior dual mode lightheads utilize visible light sources coupled with infrared filters to produce the infrared light, generating high temperatures within the lighthead that can limit the life of the light elements, lenses, and sealing materials.

U.S. Pat. No. 5,589,901 to Means, the entirety of which is hereby incorporated by reference, describes an apparatus and method for synchronizing control of separate search and surveillance devices, e.g. a searchlight and an infrared and/or video camera can be directly linked electronically so that a user's movement and positioning of one of the devices directly determines the movement and positioning of the other device. However, this system requires a relatively complex comparator to permit the synchronized operation of the separate devices. Accordingly, the present inventors have determined that there is a need for a dual or multi-mode lighthead that is easier to maintain, provides higher intensity light output, and operates at a lower temperature to extend lighthead component life.

SUMMARY OF THE PRESENT INVENTION

The present invention overcomes the shortcomings associated with the background art and achieves other advantages not realized by the background art.

An aspect of the present invention, in part, is directed toward a multi-mode lighthead that is easier to re-lamp, provides improved light output, and generates less heat as compared to prior dual mode lightheads.

An additional aspect of the present invention, in part, is to address flight crew visibility issues associated with aircraft operations during a wide range of operating conditions.

An additional aspect of the present invention, in part, is to provide an imaging module affixed to the canopy of a searchlight.

An additional aspect of the present invention, in part, is to provide a remotely articulating source of visual information to a flight crew or operator without the need to modify the aircraft's structure to separately accommodate an imaging module and/or synchronize separately installed devices.

One or more of the foregoing aspects of the present invention is accomplished, in part, by a multi-mode lighthead, comprising a housing having front, rear, top, and bottom sectors; an attachment point connected with one of the sectors of the housing; a reflective device, the reflective device being mounted inside the housing and reflecting light from the front sector of the housing; an imaging module positioned within the housing to capture an image from the front sector of the housing; at least one high intensity infrared diode, the diode being installed into the housing from the rear sector of the housing and positioned to emit infrared light from the front sector of the housing; at least one visible light source, the visible light source being installed within the housing from the rear sector of the housing such that the visible light source projects through the reflective device and emits light from the front sector of the housing; and at least one lens affixed to the front sector of the housing through which at least one of emitted visible and infrared light passes.

One or more of the foregoing aspects of the present invention is also accomplished, in part, by a multi-mode lighthead, comprising a housing having front, rear, top, and bottom sectors; an imaging module positioned within the housing to capture an image from the front sector of the housing; at least one high intensity infrared diode, the diode being installed into the housing from the rear sector of the housing and positioned to emit infrared light from the front sector of the housing; and at least one visible light source, the visible light source being installed within the housing from the rear sector of the housing such that the visible light source emits light from the front sector of the housing.

One or more of the foregoing aspects of the present invention is also accomplished, in part, by a multi-mode lighthead, comprising a housing having front, rear, top, and bottom sectors; a high power infrared laser, e.g., a laser operating within a range of approximately 780 nm or greater, within the housing; a laser aperture opening at the front sector of the housing; at least one high intensity infrared diode, the diode being installed into the housing from the rear sector of the housing and positioned to emit infrared light from the front sector of the housing; and at least one visible light source, the visible light source being installed within the housing from the rear sector of the housing such that the visible light source emits light from the front sector of the housing.

One or more of the foregoing aspects of the present invention is also accomplished, in part, by a multi-mode lighthead system, the system comprising a lighthead housing having front, rear, top, and bottom sectors; an imaging module positioned within the housing to capture an image from the front sector of the housing; a display for viewing and retaining the image from the imaging module; a positioning and control system for positioning and controlling the lighthead housing; an attachment portion connected with at least one of the sectors of the housing and interfacing with the positioning and control system; at least one high intensity infrared diode, the diode being installed into the housing from the rear sector of the housing and positioned to emit infrared light from the front sector of the housing; and at least one visible light source, the visible light source being installed within the housing from the rear sector of the housing such that the visible light source emits light from the front sector of the housing.

One or more of the foregoing aspects of the present invention is accomplished, in part, by a multi-mode lighthead system, the system comprising a lighthead housing having front, rear, top, and bottom sectors; a positioning and control system for positioning and controlling the lighthead housing; an attachment portion connected with at least one of the sectors of the housing and interfacing with the positioning and control system; a high power infrared laser; a laser aperture opening at the front sector of the housing; at least one high intensity infrared diode, the diode being installed into the housing from the rear sector of the housing and positioned to emit infrared light from the front sector of the housing; and at least one visible light source, the visible light source being installed within the housing from the rear sector of the housing such that the visible light source emits light from the front sector of the housing.

One or more of the foregoing aspects of the present invention is accomplished, in part, by a multi-mode lighthead system, the system comprising a lighthead housing having front, rear, top, and bottom sectors; a positioning and control system for positioning and controlling the lighthead housing; an attachment portion connected with at least one of the sectors of the housing and interfacing with the positioning and control system; at least one of a high intensity infrared diode, the diode being installed into the housing from the rear sector of the housing and positioned to emit infrared light from the front sector of the housing, a visible light source, the visible light source being installed within the housing from the rear sector of the housing such that the visible light source emits light from the front sector of the housing, a high power infrared laser having a laser aperture opening at the front sector of the housing, and an imaging module within the front sector of the housing for capturing an image; and a searchlight controller for controlling an acquisition and fixed-position tracking of a target, the searchlight controller including absolute position sensing capability and a rangefinder accepting position data from a GPS for tracking an absolute location of the target.

One or more of the foregoing aspects of the present invention is accomplished, in part, by process for providing a multi-mode lighthead, comprising providing a housing having front, rear, top, and bottom sectors; providing an imaging module within the housing to capture an image from the front sector of the housing; providing at least one high intensity infrared diode into the housing from the rear sector of the housing to emit infrared light from the front sector of the housing; providing at least one visible light source within the housing from the rear sector of the housing such that the visible light source emits light from the front sector of the housing; and providing a positioning and control system for the lighthead, the positioning and control system controlling a position of the housing.

One or more of the foregoing aspects of the present invention is accomplished, in part, by a process for providing a multi-mode lighthead, comprising providing a housing having front, rear, top, and bottom sectors; providing an advanced navigational and visual aid, wherein the advanced navigational and visual aid is at least one of an imaging module within the housing to capture an image from the front sector of the housing, a high power infrared laser, e.g., operating within a range of 780 nm or greater, and; providing at least one high intensity infrared diode into the housing from the rear sector of the housing to emit infrared light from the front sector of the housing; providing at least one visible light source within the housing from the rear sector of the housing such that the visible light source emits light from the front sector of the housing; and providing a positioning and control system for the lighthead, the positioning and control system controlling a position of the housing.

One or more of the foregoing aspects of the present invention is accomplished, in part, by a lighthead comprising a housing having front, rear, top, and bottom sectors; an attachment portion connected with at least one of said sectors of said housing; and at least one of a high intensity infrared diode, a visible light source, a high power infrared laser, and an imaging module, said diode being installed into said housing from the rear sector of said housing and positioned to emit infrared light from the front sector of said housing, said visible light source being installed within said housing from the rear sector of said housing such that said visible light source emits light from the front sector of said housing, said high power infrared laser having a laser aperture opening at the front sector of the housing and operating at approximately 780 nm or greater, and said imaging module being positioned within said front sector of the housing for capturing an image.

These and other features will become better understood with reference to the following description, appended claims, and accompanying drawings.

BRIEF DESCRIPTION OF THE DRAWINGS

The present invention will become more fully understood from the detailed description given hereinafter and the accompanying drawings that are given by way of illustration only, and thus do not limit the present invention.

FIG. 2(a) is a rear view of a multi-mode lighthead according to an embodiment of the present invention;

FIG. 2(b) is a side view of a rear cover for the multi-mode lighthead shown in FIG. 2(a);

DETAILED DESCRIPTION OF THE PREFERRED EMBODIMENTS

Figure 1:
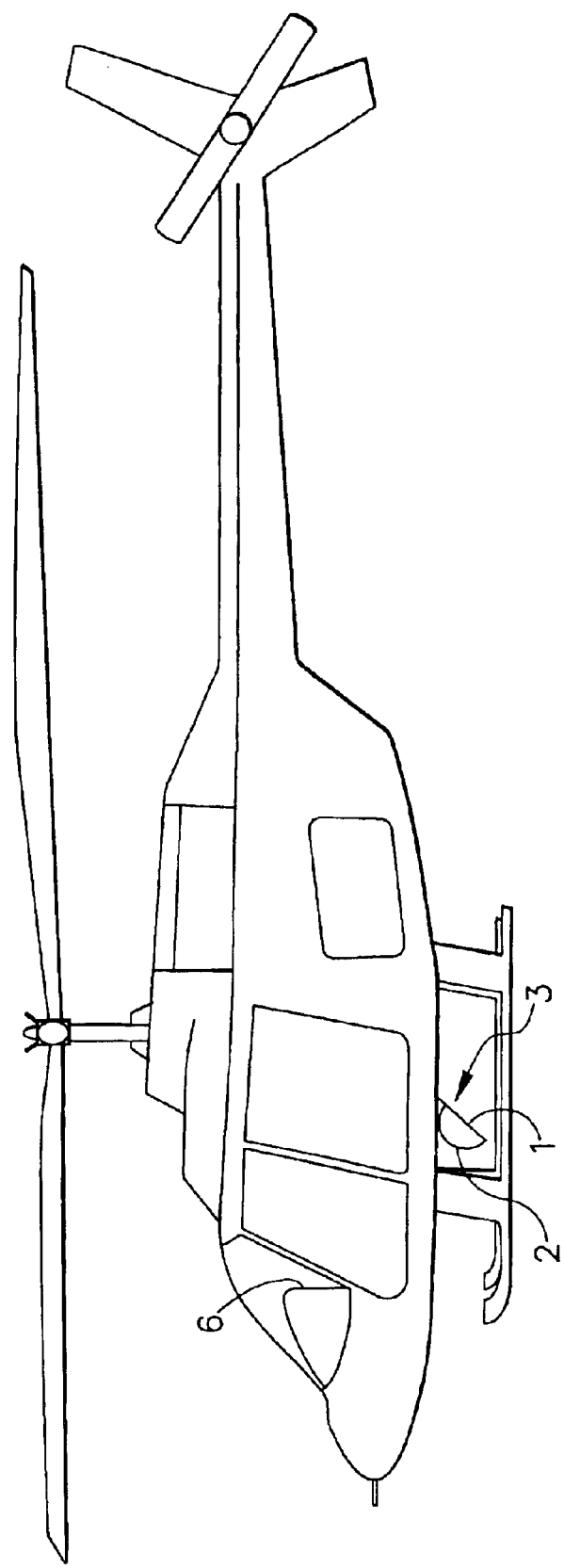
FIG. 1 is a side view of a helicopter equipped with a multi-mode lighthead according to the present invention.
Figure 3:
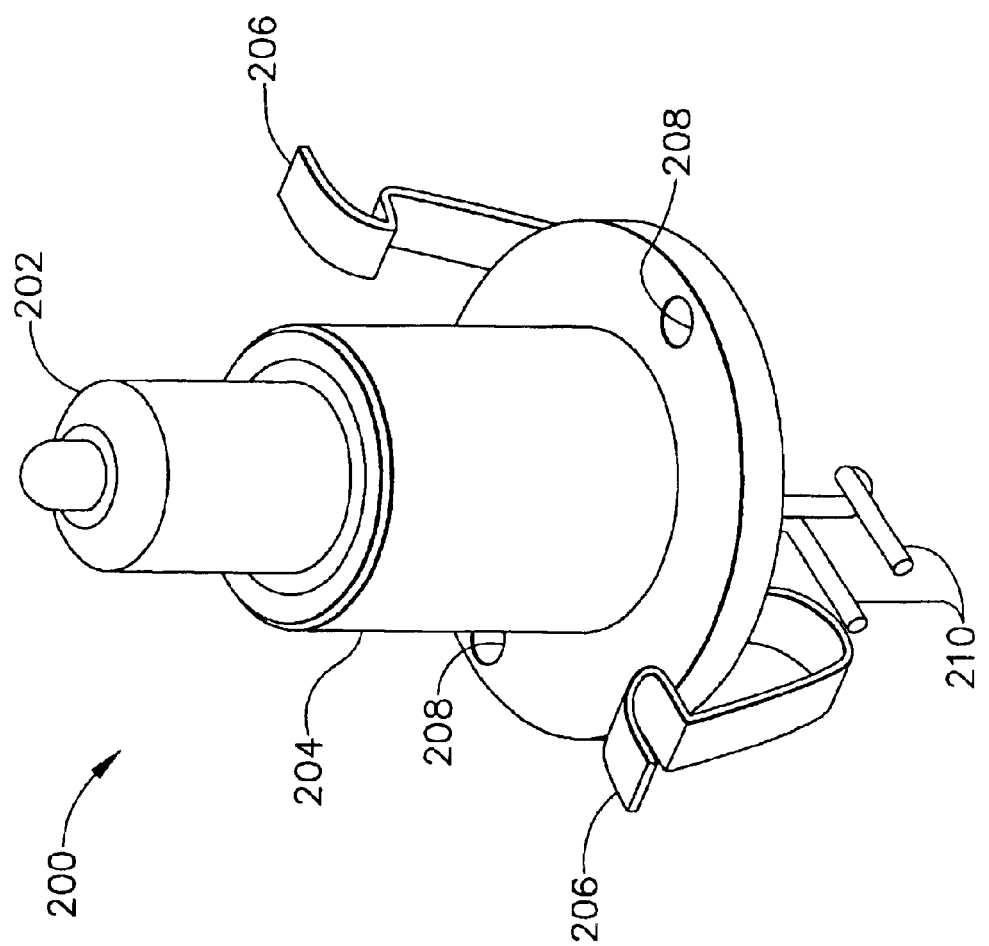
FIG. 3 is a perspective view of a visible light source for a multi-mode lighthead of the present invention.
Figure 4:
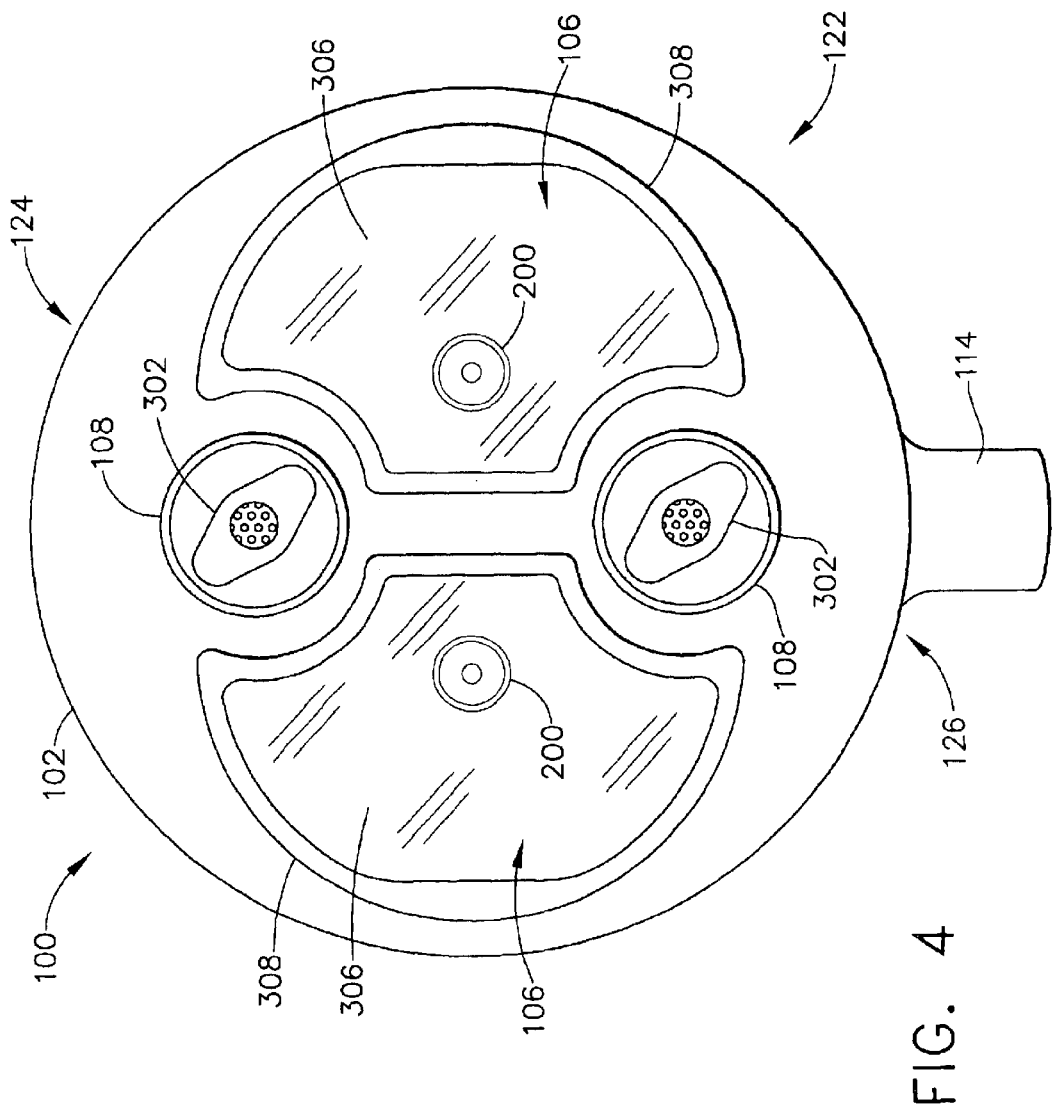
FIG. 4 is a front view of a multi-mode lighthead according to an embodiment of the present invention.
Figure 5:
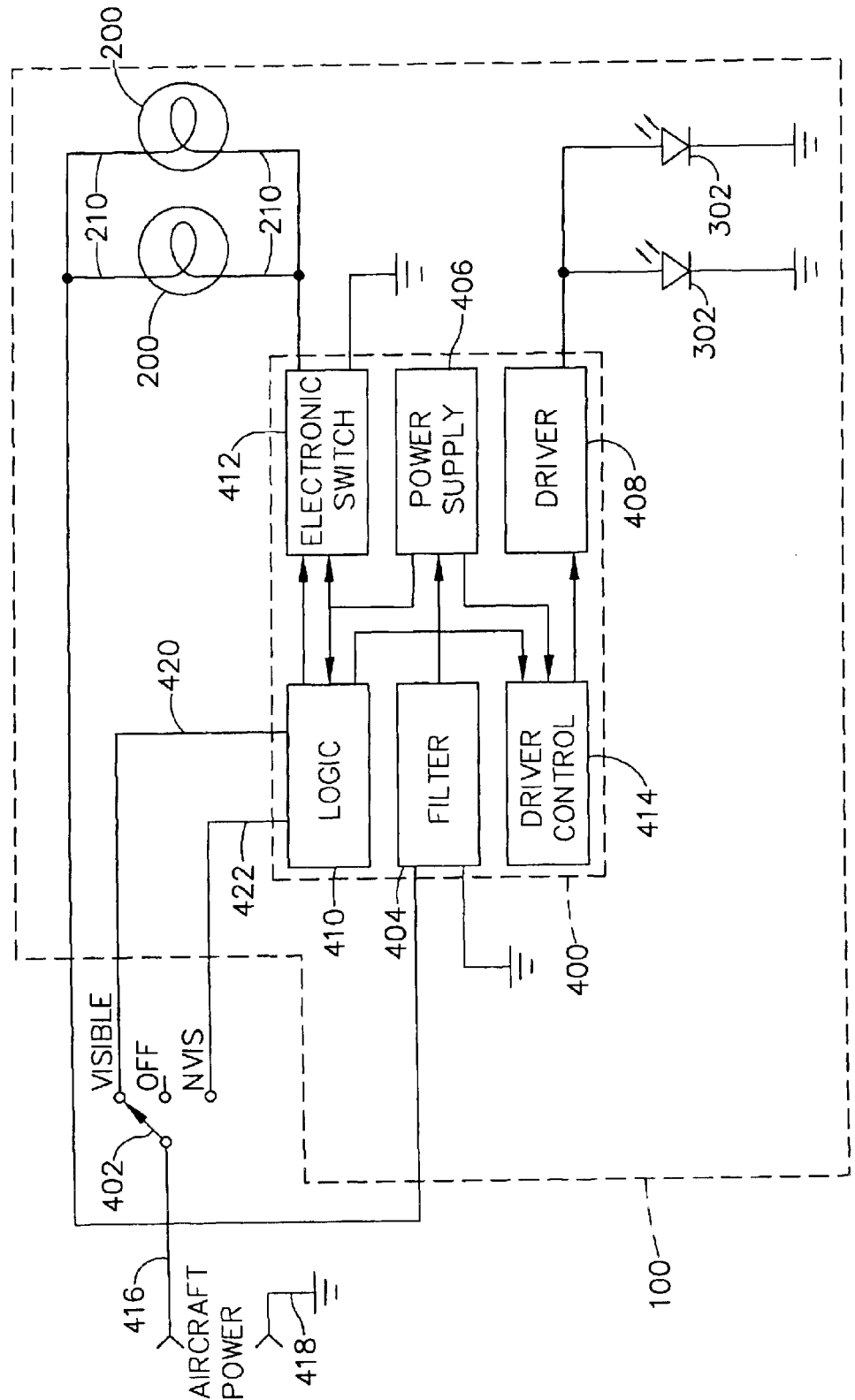
FIG. 5 is a schematic view of an exemplary electrical circuit of a multi-mode lighthead according to an embodiment of the present invention.

The present invention will now be described in detail with reference to the accompanying drawings. FIG. 1 is a side view of a helicopter equipped with a multimode searchlight according to the present invention. FIG. 2(a) is a rear view of a multi-mode searchlight according to an embodiment of the present invention. FIG. 2(b) is a side view of a rear cover for the multi-mode searchlight shown in FIG. 2(a). FIG. 3 is a perspective view of a visible light source for a multi-mode searchlight of the present invention. FIG. 4 is a front view of a multi-mode searchlight according to an embodiment of the present invention. FIG. 5 is a schematic view of an exemplary electrical circuit of a multi-mode searchlight according to an embodiment of the present invention.

The present inventors have analyzed the needs of the background art and identified several shortcomings associated with the systems of the background art. For example, the present invention incorporates a modular design having a housing, preferably a cast aluminum housing. Specifically, the housing is designed to accommodate installation of lighting elements from the rear of the lighthead. This prevents contamination of the reflector with dirt, oil, or fingerprints that can reduce the optical efficiency of the reflector. Installing the lighting elements from the rear also reduces maintenance time, since the front lens does not have to be removed and then re-sealed as with systems of the background art.

Replacement of front-mounted halogen lamps of the background art also involves grasping the glass envelope of the lamp to install it into a socket. Since the presence of contaminating agents such as dirt, oil and fingerprints on the lamp's glass envelope can reduce the life of the lamp, maintenance personnel must use cotton gloves or other protective materials when replacing lamps. The present invention utilizes a visible light source that includes a base that allows maintenance personnel to handle and install the lamp from the rear of the lighthead without touching or otherwise contaminating the glass envelope. Further, the lamp base allows the visible light source to be easily installed and removed without the need for tools.

The present invention also utilizes high intensity infrared diodes in contrast to the filtered visible light sources used in prior lightheads. High intensity infrared diodes offer increased infrared light emission along with higher efficiency, reduced power consumption, longer life, and reduced heat generation. The high intensity infrared diodes also facilitate faster and simpler replacement due to their modular design. Although the present invention will be described in greater detail hereinafter with reference to aircraft, e.g., a helicopter, one of skill in the art will appreciate that the present invention is equally applicable to a plurality of land, aerospace and marine applications and systems.

FIG. 1 is a side view of a helicopter equipped with a multi-mode searchlight according to the present invention. As seen in FIG. 1, a multi-mode searchlight 3 may be installed into a lower fuselage of the helicopter. Images from an imaging module 1 are routed to a display 6 mounted within the helicopter cockpit. In addition, the multi-mode searchlight may be used to provide imaging information in addition to pilot-selectable visible and infrared illumination.

For daylight aircraft operations, the position of the imaging module 1 in the present invention may be remotely directed by the flight crew through the use of existing "Extend-Retract" and "Rotate" cockpit controls used to adjust the position of a canopy 2. Images from the imaging module 1 are shown on the display 6 for providing the flight crew with visual information. For example, the imaging module 1 may be aimed below or aft of the helicopter, thereby allowing the flight crew to see areas that are normally blocked from view by the aircraft's structure. For nighttime operations, the imaging module 1 may be used in conjunction with visible lighting elements 200 or infrared lighting elements 302. The lighting elements of the searchlight will serve to illuminate the area to be observed with the imaging module 1 under a wide range of conditions.

U.S. Pat. No. 6,315,435 to Hamilton et al.; U.S. Pat. No. 4,115,841 to Alexander; U.S. Pat. No. 5,589,901 to Means;

and U.S. Pat. No. 5,695,272 to Snyder et al., the entirety of each of which are hereby incorporated by reference, describe various methods and equipment for positioning, controlling and arranging multi-mode searchlights for aircraft that are commonly employed in the related art. One of skill in the art will appreciate that numerous variations and methods may be employed for controlling the multi-mode searchlight of the present invention.

FIG. 4 is a front view of a multi-mode searchlight according to an embodiment of the present invention. Views of a rear side of a multi-mode lighthead 100 are also shown in FIGS. 2(a) and 2(b), e.g., however, an imaging module 1 is not shown. The multi-mode lighthead 100 includes a housing 102 having a rear sector 128, a top sector 124, and a bottom sector 126. The housing 102 also includes a front sector 122, shown in FIG. 4 and discussed in greater detail hereinafter. The housing 102 may be comprised of a cast or machined material, preferably aluminum, and may optionally include a plurality of cooling fins 104 to aid in the dispersion of heat generated by the light sources.

The housing 102 further includes parabolic reflector cavities 106 shaped to optimize the optical design for the visible light portion of the lighthead 100, wherein the visible light is emitted from the front sector 122 of the housing 102. Lamp retainer slots 130 are cast or machined into the reflector cavities 106 to facilitate installation of the visible light sources 200, discussed in greater detail hereinafter. Cavities 106 may also optionally include a plurality of heat-sink ribs 108 to help carry away heat generated by the visible light sources.

Figure 7:
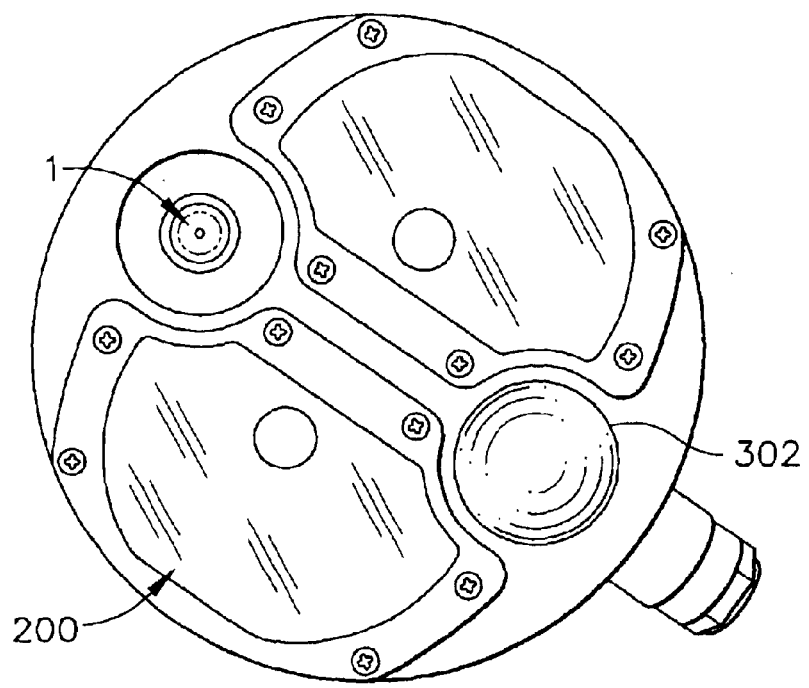
FIG. 7 is a photographic view of the multi-mode lighthead shown in FIG. 6.
Figure 8:
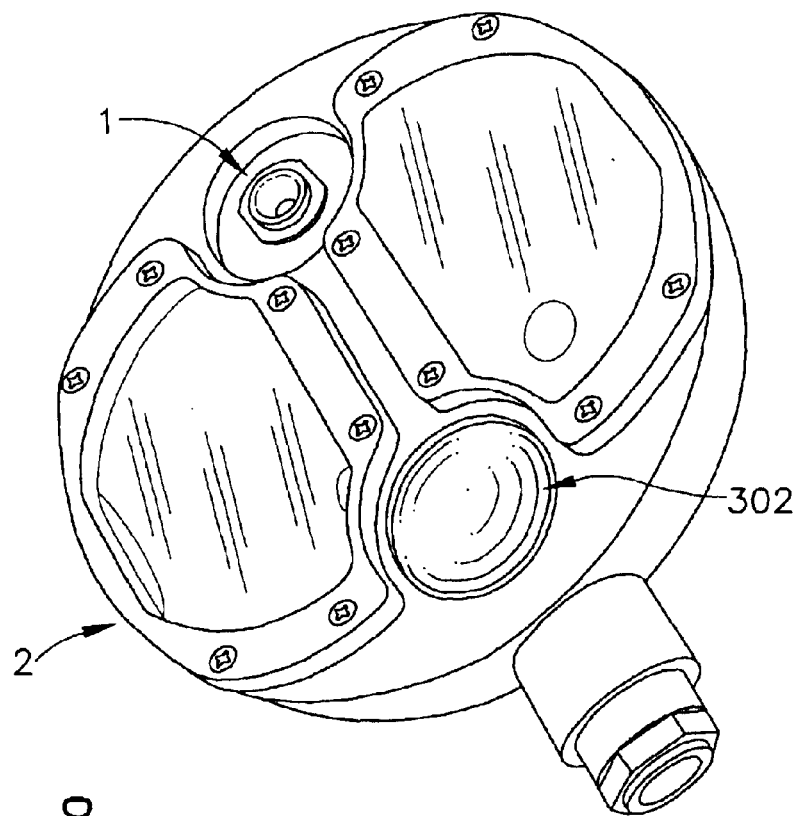
FIG. 8 is a photographic view of the multi-mode lighthead shown in FIG. 6.

As seen in FIGS. 2(a), 7 and 8, the openings 110 accommodate the infrared light sources 302 or the imaging module 1, and the openings 112 accommodate the visible light sources 200 of the lighthead 100. An attachment point 114 is affixed to the bottom sector 126 of housing 102 and facilitates mounting of the lighthead 100 directly to the aircraft structure, or optionally to the pivot device and components of a landing light or searchlight. A rear cover 116 secured with a plurality of screws 118 to the receptacles 120 protects the interior of the lighthead 100 from the elements.

FIG. 3 is a perspective view of a visible light source for a multi-mode searchlight of the present invention. The visible light source 200, shown in greater detail in FIG. 3, may include an incandescent lamp 202, preferably halogen, affixed to a lamp base 204. The lamp base 204 provides a convenient surface for handling the visible light source 200 without contaminating the lamp 202. One or more retaining springs 206 are attached to the lamp base 204 by conventional fasteners such as rivets 208 or retaining clips. The lamp leads 210 facilitate connection of electrical power to the lamp 202.

FIG. 4 is a front view of a multi-mode searchlight 3 according to an embodiment of the present invention. As seen in FIGS. 2(a), 2(b), 3 and 4, the infrared light sources 302, preferably high intensity infrared diodes, are installed into the openings 110 from the rear sector 128 of the housing 102 and facing toward the front sector 122. The visible light sources 200, preferably halogen lamps, are installed into the openings 112 from the rear sector 128 of housing 102 and facing toward the front sector 122 of housing 102. As each visible light source 200 is pressed through an opening 112 of housing 102, the retaining springs 206 spread and then snap into the lamp retainer slots 130 for firmly holding the visible light source 200 in place.

Cast aluminum reflectors 306 are installed into cavities 106 to optimize light emission from visible light sources 200. The lenses 308 are installed onto the front sector 122 of the housing 102 and sealed to protect the interior of the lighthead 100 from the elements. The attachment point 114 is affixed to the bottom sector 126 of the housing 102 and facilitates mounting of the lighthead 100 directly to the aircraft structure, or optionally to the pivot mechanism or canopy 2 of a landing light or searchlight 3.

FIG. 5 is a schematic view of an exemplary electrical circuit of a multimode searchlight according to an embodiment of the present invention. As shown in FIG. 5, electrical power for the dual mode lighthead is supplied by power input lines 416, 418. One of skill in the art will appreciate that the circuitry of the multi-mode searchlight can easily be modified to accommodate a variety of devices and arrangements as described in greater detail hereinafter. In FIG. 5, electrical power is controlled by a switch 402, which provides logical electrical input signals to the logic circuit 410 of the control circuit 400 via the logic lines 420, 422. If logic circuit 410 detects the presence of an electrical voltage on the "visible" logic line 420, the electronic switch 412, such as a power metal oxide semiconductor field effect transistor (MOSFET), is activated, thereby causing the visible light sources 200 to emit visible light.

If logic circuit 410 detects the presence of an electrical voltage on the "NVIS" logic line 422, the driver control 414 activates the driver 408. The driver 408, such as an electrical current limiter, supplies a controlled amount of electrical current to the infrared light sources 302, thereby causing the infrared light sources 302 to emit infrared light. The logic circuit 410 turns off both the visible light sources 200 and the infrared light sources 302 when no voltage is detected on either of the logic lines 420, 422. In addition, the logic circuit 410 also turns off both the visible light sources 200 and the infrared light sources 302 if an illegal logic condition exists, e.g., such as voltage present on both logic lines 420, 422.

A high-voltage protection filter 404 isolates electrical noise between the aircraft and the control circuit 400. The power supply 406, such as a voltage regulator, conditions the power from the aircraft to a voltage level suitable for the components in the exemplary control circuit 400. The imaging module 1 would be powered by either a common or separate power supply, and likely include a separate control circuit for positioning and operating the imaging module 1 and the information that is directed toward the cockpit display 6.

In operation, the multi-mode mode searchlight 3 is mounted to a fixed or retractable landing light mechanism, or a searchlight mechanism. A control switch 402, located in the cockpit, is typically in the "Off" position causing electrical power to be removed from both the visible lamps 200 and the infrared light sources 302. When the operator sets control switch 402 to the "visible" position, electronic switch 412 is activated, thereby applying power to the visible light sources 200 and causing them to emit a bright visible light. If the operator places switch 402 in the "NVIS" position, driver 408 is actuated, and the infrared light sources 302 emit infrared light to facilitate searching, targeting, and landing during covert operations.

Although the present invention has been shown and described herein with reference to a particular embodiment for a particular application, the present invention is not limited to aviation uses. As aforementioned, the present invention is immediately applicable to hand-held and stationary fixtures as well as all types of vehicular traffic, including automotive, marine, and railroad.

Figure 6:
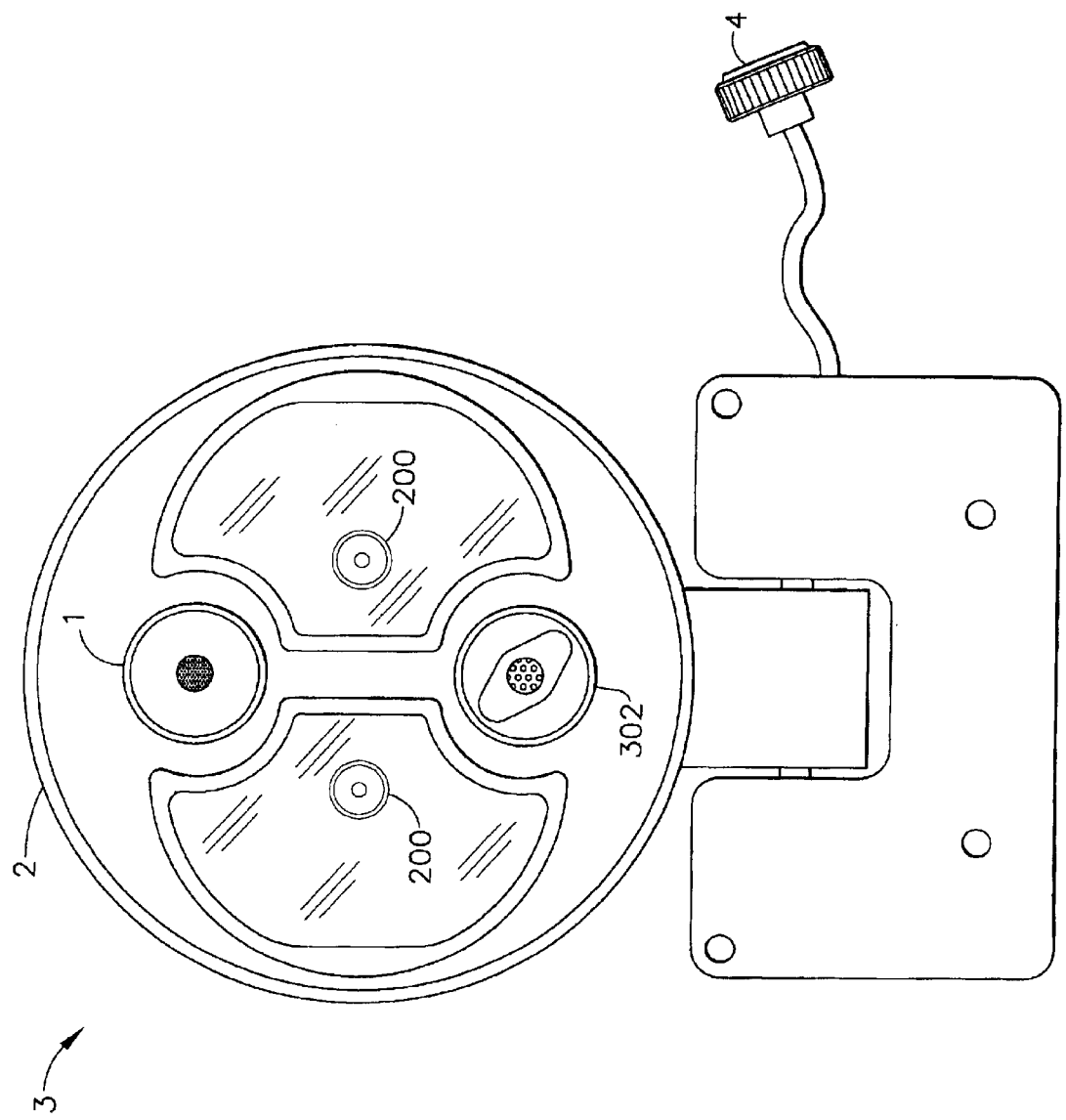
FIG. 6 is a front view of a multi-mode lighthead according to an embodiment of the present invention.

FIG. 6 is a front view of a multi-mode searchlight according to another embodiment of the present invention. FIG. 7 is a photographic view of the multimode searchlight shown in FIG. 6. FIG. 8 is a photographic view of the multi-mode searchlight shown in FIG. 6. As shown in FIG. 6, an imaging module 1 that is sensitive in the near infrared ("IR") region, e.g., such as up to 1100 nm, is placed into a canopy 2 of a multi-mode searchlight 3. The canopy 2 is remotely movable over a wide range of positions by conventional electromechanical devices and systems such as motors and gears, including the additional positioning and control system(s) and methods of the background art described hereinabove and already incorporated by reference.

A separate connector 4 may be attached to the multi-mode searchlight 3 to provide an interface to the imaging module 1. One or more visible lighting elements 200 are used for illuminating a desired target with visible light during normal nighttime aircraft operations, and one or more infrared lighting elements 302 are compatible with Night Vision Imaging Systems (NVIS) and are used for illuminating a desired target with infrared light during covert nighttime aircraft operations. One of skill in the art will appreciate that only a single imaging module 1, single infrared lighting element 302 and a pair of visible lighting elements 200 are shown in FIG. 6. However, the quantity, intensity and characteristics of each of the aforementioned elements can be easily modified to accommodate various applications and mission requirements.

It should also be noted that additional functions may be incorporated into the canopy 2 in order to take advantage of the remote articulating capabilities of the canopy 2. For example, a laser emitter may be attached to the canopy and used as a pointer for targeting and/or visual aid. In addition, the multi-mode searchlight of the present invention may incorporate control systems integrated with fixed targeting and/or navigational aids.

For example, the present inventors have determined that pilots have a need to operate an infrared laser designator 400 operated in conjunction with a visible light element 200 searchlight in order to covertly position the searchlight prior to illumination with visible light through the searchlight 3. Alternatively, pilots may need to command and control an infrared laser designator 400 for targeting purposes and/or for navigational purposes, e.g., to covertly illuminate or designate a building or landing area with or without a searchlight capability.

Figure 9:
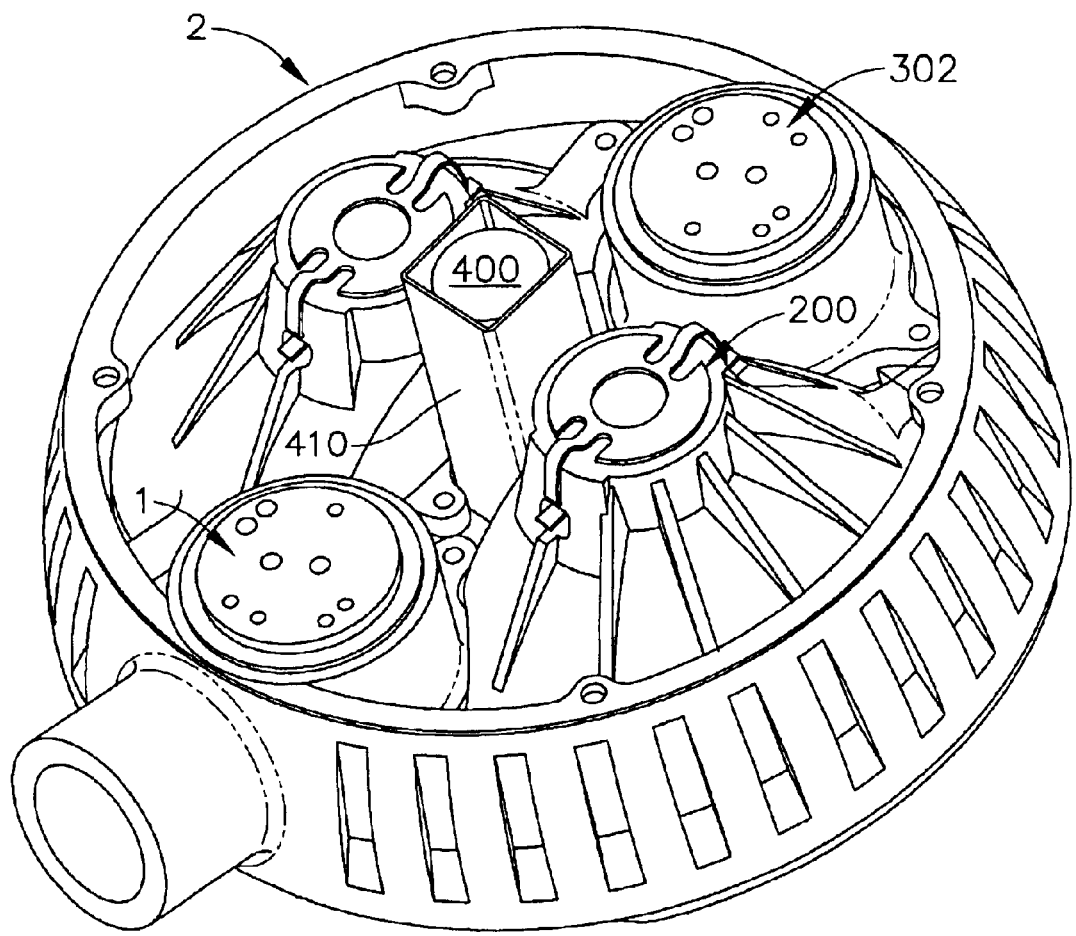
FIG. 9 is a rear view of a multi-mode lighthead according to an embodiment of the present invention.
Figure 10:
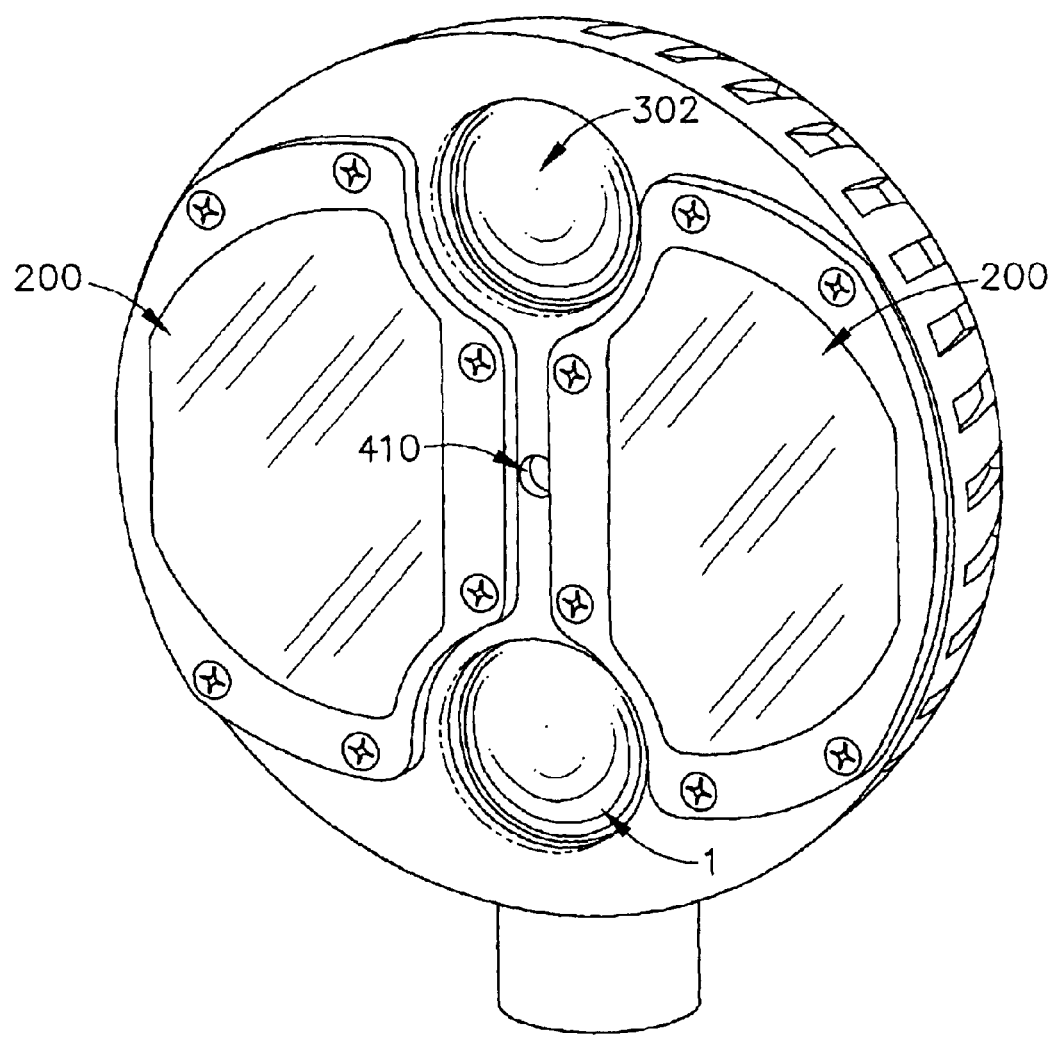
FIG. 10 is a front view of the multi-mode lighthead shown in FIG. 9.
Figure 11:
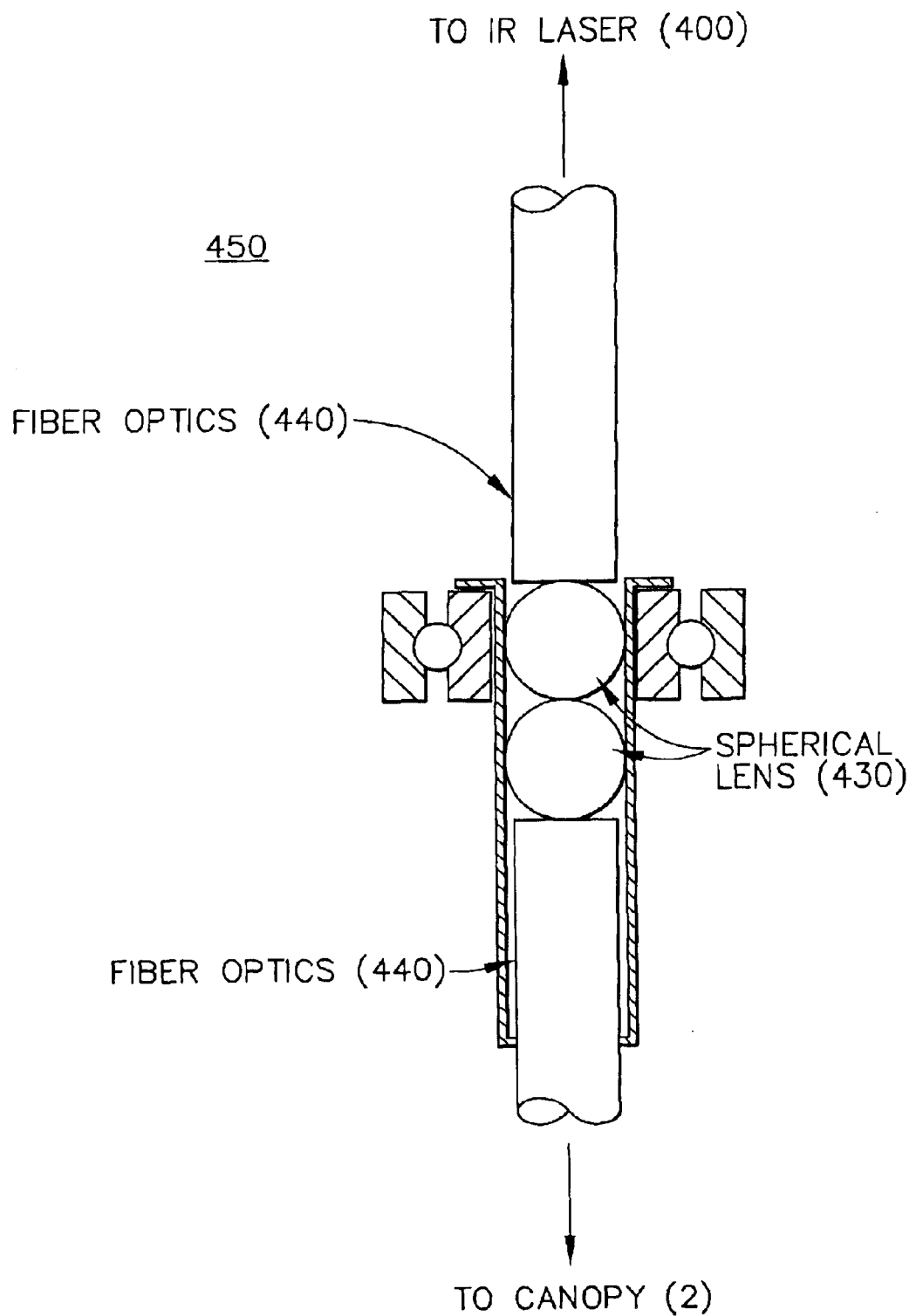
FIG. 11 is a partial, side view of an optical slip ring assembly according to an embodiment of the present invention.
Figure 12:
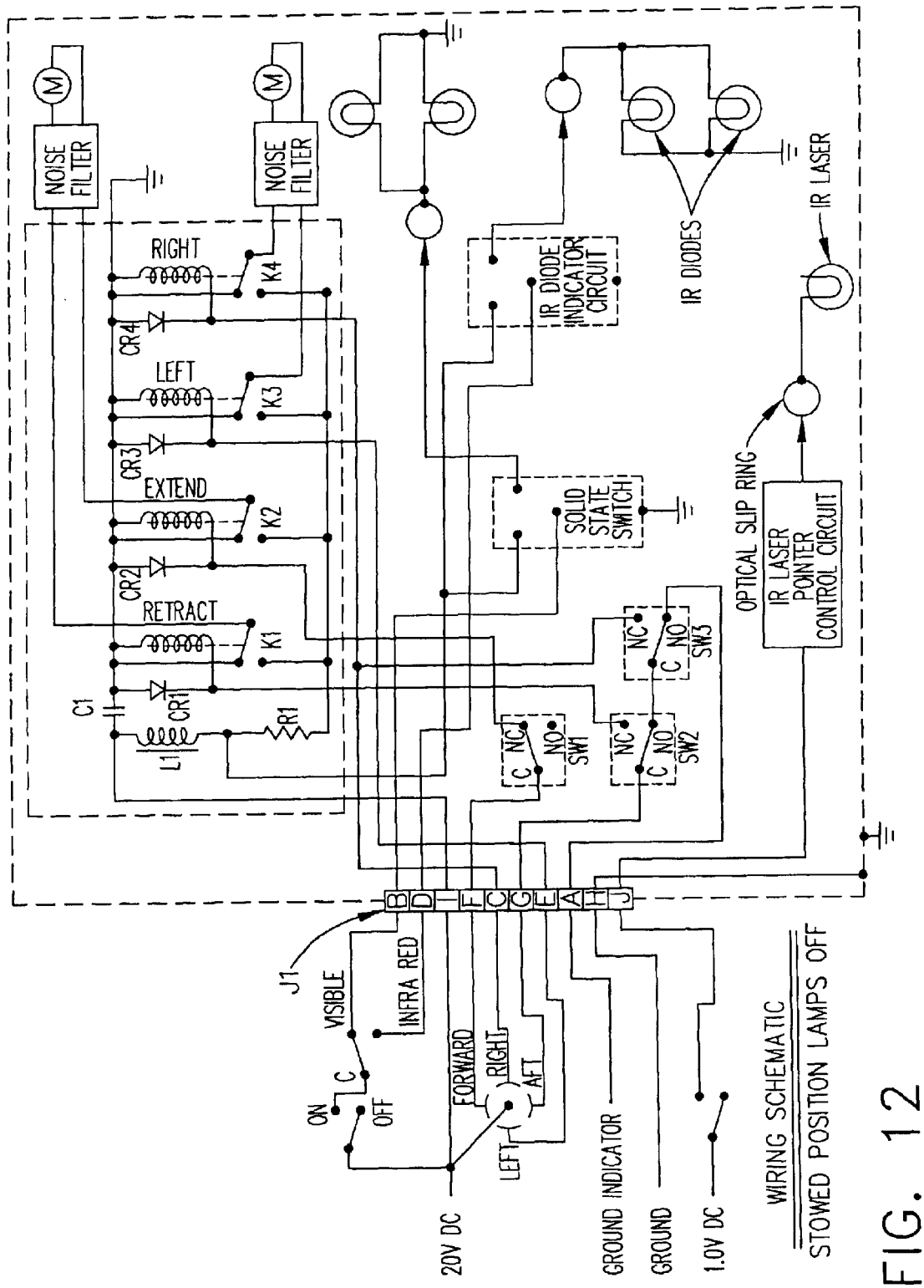
FIG. 12 is a schematic view of an exemplary wiring diagram for a multi-mode lighthead of the present invention having visible light, infrared light and/or infrared laser designator capabilities.

FIG. 9 is a rear view of a multi-mode lighthead according to an embodiment of the present invention. FIG. 10 is a front view of the multi-mode lighthead shown in FIG. 9. FIG. 11 is a partial, side view of an optical slip ring assembly according to an embodiment of the present invention. FIG. 12 is a schematic view of an exemplary wiring diagram for a multi-mode lighthead of the present invention having visible light, infrared light and/or infrared laser designator capabilities.

Where an IR laser, e.g., operating at 780 nm or greater, is integrated into the multi-mode searchlight 3 seen in FIG. 6, e.g., in place of the IR lighting element 302, a pilot or navigator can position the searchlight 3 to immediately illuminate a target. The mechanical slewing system of the searchlight permits a covert beam to be directed onto the desired object or location. Alternatively, the searchlight can be used to communicate target location or navigational information even while the visible light element 200 is not being operated. For example, an IR laser 400 may communicate within a range of approximately 2 miles, thereby providing expanded communication and navigation in a variety of operating conditions.

FIGS. 9 and FIG. 10 are views of a searchlight 3 incorporating a high power infrared laser, e.g., 50 mW or greater and operating at approximately 780 nm or greater within a canopy 2. As seen in FIG. 9 and FIG. 10, the IR laser 400 is mounted in an insulated housing 410 which in turn is installed in the searchlight canopy 2, e.g., a PAR-46 NG canopy is used to illustrate this mounting configuration, although alternative canopy designs can be readily incorporated into the present invention as necessary. For example, a canopy 2 having infrared modules 302, visible lighting modules 200 and an imaging module 1 is shown in FIGS. 9 and 10. However, one of skill in the art will appreciate that a canopy 2 can easily be equipped with alternative arrangements, e.g. a pair of infrared modules 302, a pair of visible lighting modules 200 and an IR laser 400, thereby excluding the imaging module 1. As seen in FIG. 10, an IR navigational and/or targeting laser aperture 410 is provided on the front sector of the canopy 2 for the operation of the IR laser 400.

However, the IR laser 400 shown in FIGS. 9 and 10 does not need to be located within the canopy 2. Alternatively, the laser 400 is instead first installed in an insulated housing 410 and is in turn installed in a remote location away from the canopy 2, e.g. such as the searchlight 3 base or other portion on the fuselage of a helicopter or aircraft. One end of a fiber optic light guide 440 may be attached to the laser module 400 and the other end may be fed into the canopy 2. Inside the canopy 2, the energy from the end of the fiber can be optically re-collimated.

However, in order for the searchlight 3 to have a 360 degree rotational capability, the fiber optic 440 must incorporate an optical slip ring 450, such as the one shown in FIG. 11. The optical slip ring 450 shown includes a bearing assembly (shown but not labeled), a spherical lens 430, and the necessary fiber optics 440 for operation in conjunction with a IR laser 400 and rotating searchlight 3. However, any optical slip ring assembly having fiber optics, a lens device, a stationary portion, e.g. connecting to the IR laser 400, and a rotating portion, e.g., connecting to the canopy 2, may be incorporated into the present invention.

As aforementioned, FIG. 12 is a schematic view of an exemplary wiring diagram for a multi-mode lighthead of the present invention having visible light, infrared light and/or infrared laser designator capabilities. The wiring diagram shown is directed toward a multi-mode lighthead system in which the IR laser 400 is mounted exterior to the housing of the canopy 2, e.g., the IR laser 400 is mounted in the vicinity of the canopy 2 with the use of an optical slip ring as described above.

An additional aspect of the present invention is directed toward a fixed-target tracking searchlight, e.g., employing visible 200 and/or infrared modules 302 and absolute position sensing. As aforementioned, U.S. Pat. No. 6,315,435 to Hamilton et al., the entirety of which is hereby incorporated by reference, describes an electronically controlled, programmable multi-mode searchlight of the background art particularly useful for mounting on helicopters. This type of searchlight uses a digital electronic control circuit in conjunction with rotary potentiometers to control movement of the searchlight with preset positions. In addition, a microprocessor controlled electronic circuit for operating the searchlight is described by Hamilton et al. The lighthead operates within a predefined range of motion. However, the range of motion may be altered by reprogramming the microprocessor to adjust the corresponding circuit instead of manually adjusting a trimpot. The device described by Hamilton et al. partially sought to eliminate the awkward and time-consuming task of moving micro-switches.

Similarly, the present inventors have determined that helicopter pilots currently and disadvantageously use multi-position momentary switches to control one or more helicopter-mounted searchlights. In addition, the systems of the background art such as that described by Hamilton et al., provide a searchlight capability with absolute position sensing. However, the present invention includes advantageous features such as the implementation of GPS-type position and range data as well as processing and active control capability.

In many cases, the pilot needs to illuminate a specific object or location on the ground or in the water beneath the helicopter while a search & rescue or other similar mission is performed. As the helicopter moves relative to the fixed target, the pilot must continuously adjust the searchlight position to compensate for this movement. This searchlight control provides additional work-load for the pilot or co-pilot.

Figure 13:
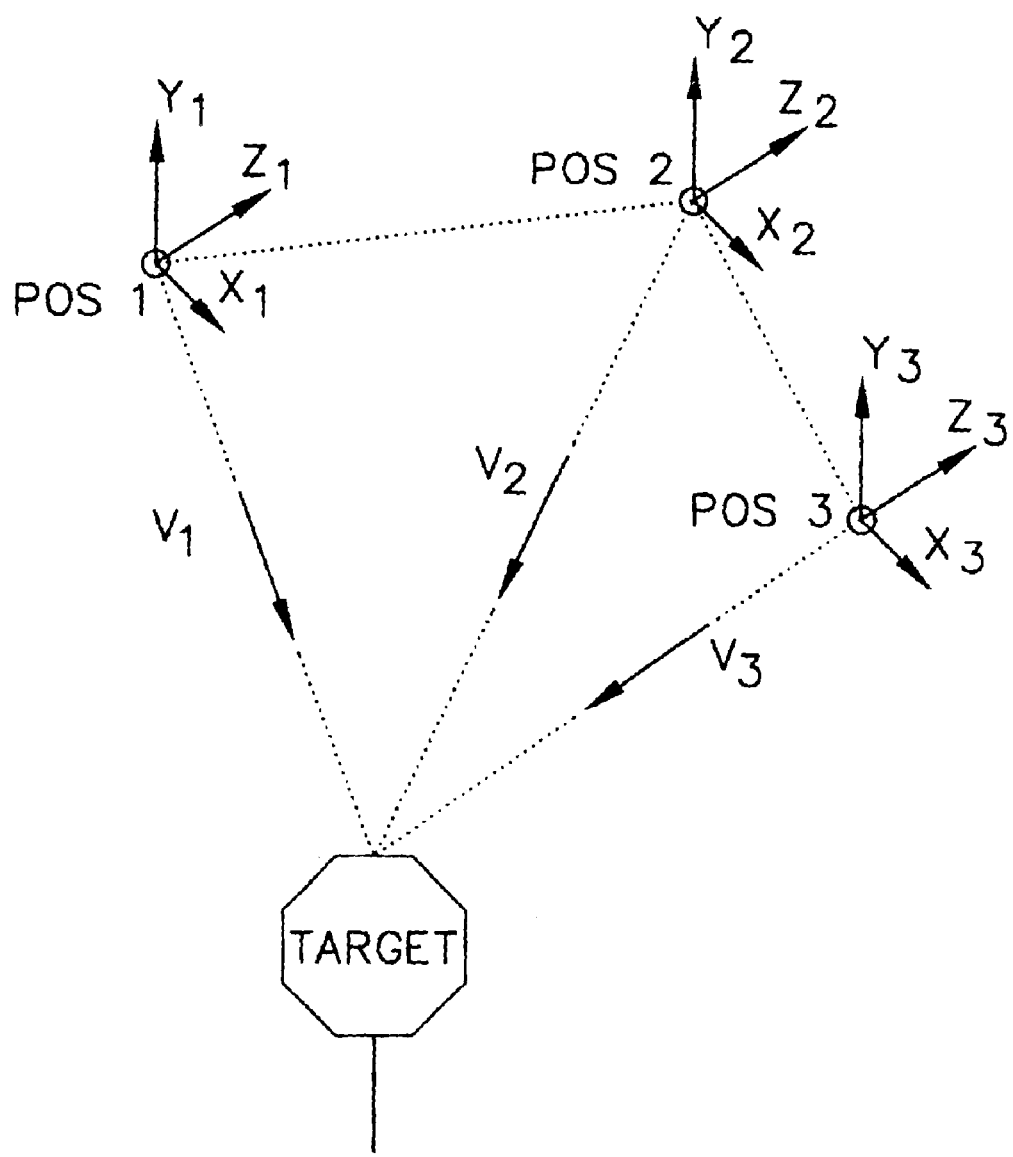
FIG. 13 is a vector diagram of the relationship between a target and a multi-mode, fixed tracking lighthead of the present invention.

FIG. 13 is a vector diagram of the relationship between a target and a multi-mode, fixed tracking lighthead of the present invention. Upon initial illumination of a fixed-position target, the pilot activates an "acquire" switch. A controllable searchlight with absolute position sensing and a rangefinder accepts helicopter position data, for example GPS (Global Positioning System) data as an input and combines this with range data to the fixed target in order to calculate the absolute location of the fixed target. Active feedback and control of the searchlight provides a way to maintain the searchlight beam passing through this 3D point in space.

Figure 14:
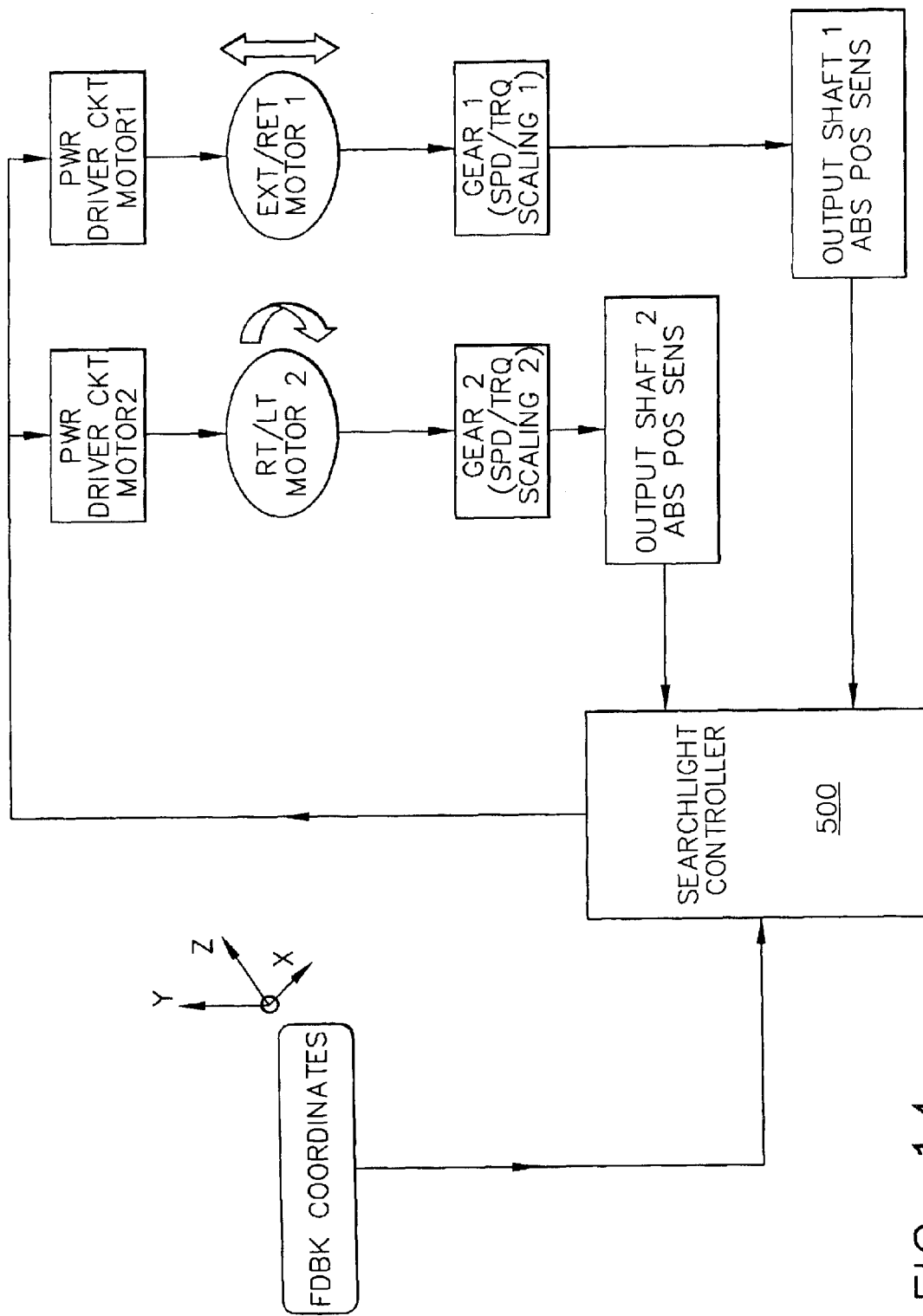
FIG. 14 is a block diagram of a multi-mode lighthead of the present invention incorporating fixed-target tracking searchlight capability.

FIG. 14 is a block diagram of a multi-mode lighthead of the present invention incorporating fixed-target tracking searchlight capability. The fixed target tracking searchlight utilizes a searchlight controller 500 for processing feedback coordinates from a tracking system, e.g., data such as that shown in FIG. 13. One of skill in the art will appreciate that the searchlight controller can be utilized with modification or duplicated to support additional functions such as the imaging module 1, infrared module 302, etc. In the exemplary system shown in FIG. 14, a first and second power driver circuit motor, a right/left motor, an extend/retract motor, respective gear assemblies with speed and torque scaling and an output shaft for controlling the absolute position sensing of the searchlight is provided and controlled via the searchlight controller 500.

The fixed-target tracking function is achieved by real-time feedback of the helicopter position location to the searchlight controller and combining this data with the helicopter altitude to establish the "reference" searchlight to target coordinate(X1,Y1,Z1) with a lock vector V1. As seen in FIG. 13 and FIG. 14, when the helicopter position changes, new real-time coordinates (Z2,Y2,Z2) will be updated and processed in combination with the reference (X1,Y1,Z1) coordinates to establish a position correction error which prompts the controller to activate the "extend/retract" and "rotate R/L" motors of the searchlight until a new lock vector V2 on the target with zero error is established. This process will continue as the helicopter moves to another position, e.g., (X3,Y3,Z3) with vector V3 , (X4,Y4,Z4) with vector V4, . . . etc.

If the multi-mode lighthead is employed as a searchlight 3 for a helicopter, the position-locking searchlight will utilize GPS and rangefinder data to establish object location. The feedback system can automatically lock the searchlight 3 on an object or target regardless of helicopter movement and without the necessity of pilot control. One of skill in the art will appreciate that the aforementioned embodiment will be particularly useful for SAR, for targeting applications and for generally reducing pilot workload while increasing flight crew safety.

Figure 15:
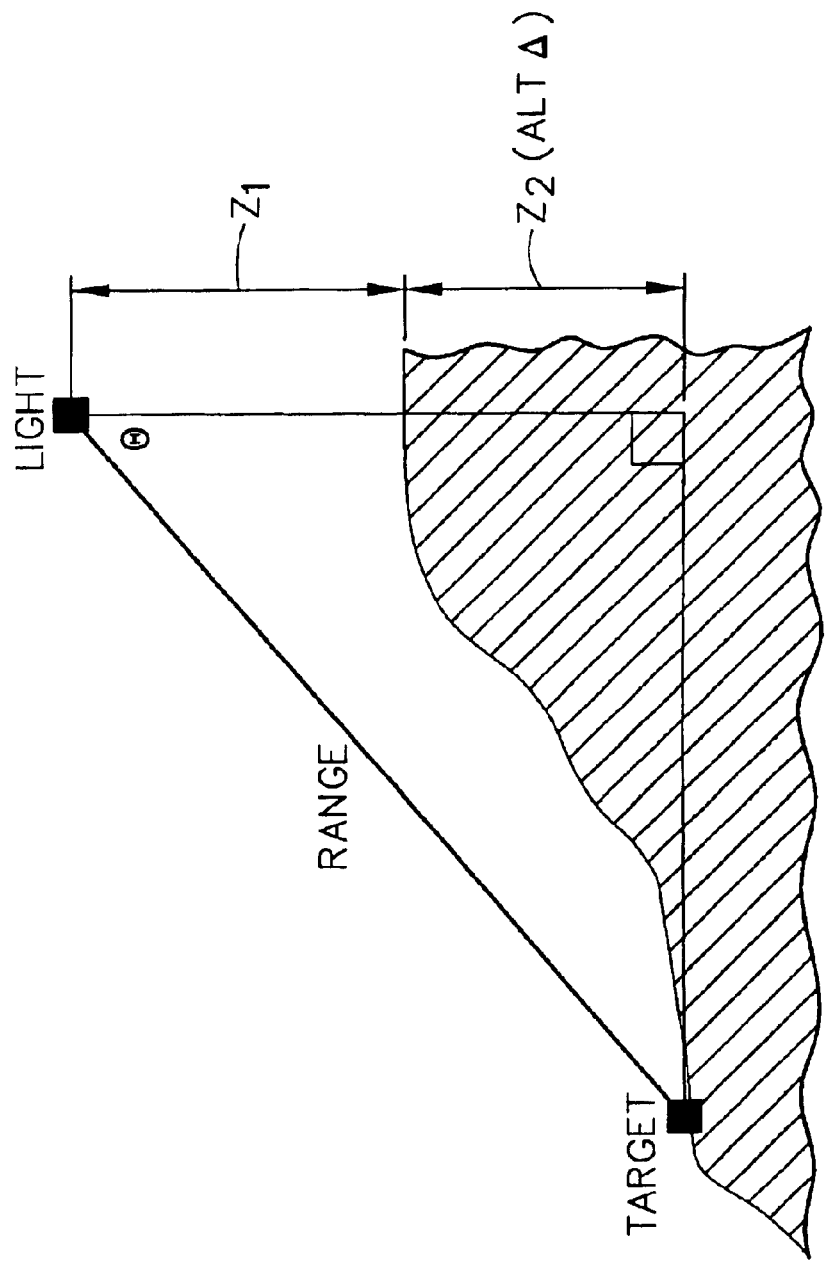
FIG. 15 is a graphical view of a relationship between target and searchlight positions in terms of altitude and/or range.

FIG. 15 is a graphical view of a relationship between target and searchlight positions in terms of altitude and/or range. When equipped with rangefinding capability, an operator of the present invention will be able to determine the altitude difference Z2 between the position of a target and the altitude of the searchlight relative to earth. As seen in the FIG. 15, the range is shown as the hypotenuse of the right triangle shown and defined by the angle to target $\theta$. An alternative variation on the embodiment shown in FIG. 15, e.g., ranging with altitude-independence, may be accomplished without rangefinding capabilities, e.g. same-altitude tracking.

An alternative embodiment of the present invention accepts altitude and GPS-type position information to command the active searchlight to a specific predetermined target or 3D location, intuitively directing a pilot to a target's location. Additionally, the searchlight can be enabled to automatically sweep in a pre-programmed sequence for visual searches of terrain. Accordingly, the multi-mode lighthead and systems described with respect to the present invention provide various combinations of video, laser, visible and infrared lighting, rangefinder and positioning capability.

What is claimed is:

1. A multi-mode lighthead, comprising:

a housing having front, rear, top, and bottom sectors;

an attachment point connected with one of said sectors of said housing;

a reflective device, said reflective device being mounted inside said housing and reflecting light from the front sector of said housing;

an imaging module positioned within said housing to capture an image from said front sector of the housing;

at least one high intensity infrared diode, said diode being installed into said housing from the rear sector of said housing and positioned to emit infrared light from the front sector of said housing;

at least one visible light source, said visible light source being installed within said housing from the rear sector of said housing such that said visible light source projects through said reflectors and emits light from the front sector of said housing;

a plurality of openings formed within said rear sector of said housing and extending between said front and rear sectors, wherein said diode and said visible light source extend through said openings and are operatively secured to said housing at said rear sector of said housing; and at least one lens affixed to the front sector of said housing through which at least one of emitted visible and infrared light passes.

2. The multi-mode lighthead according to claim 1, further comprising at least one heat dissipation device for carrying away heat generated by at least one of said visible light source, said infrared diode and said imaging module.

3. The multi-mode lighthead according to claim 1, further comprising:

an electrical power source applied to said lighthead; and an electrical power control circuit for controlling said power source.

4. A multi-mode lighthead, comprising:
a housing having front, rear, top, and bottom sectors;
an attachment point connected with one of said sectors of said housing;
a reflective device, said reflective device being mounted inside said housing and reflecting light from the front sector of said housing;
an imaging module positioned within said housing to capture an image from said front sector of the housing;
at least one high intensity infrared diode, said diode being installed into said housing from the rear sector of said housing and positioned to emit infrared light from the front sector of said housing;
at least one visible light source, said visible light source being installed within said housing from the rear sector of said housing such that said visible light source projects through said reflectors and emits light from the front sector of said housing;
at least one lens affixed to the front sector of said housing through which at least one of emitted visible and infrared light passes; and a detachable cover affixed to the rear sector of said lighthead.

5. A multi-mode lighthead, comprising:
a housing having front, rear, top, and bottom sectors;
an attachment point connected with one of said sectors of said housing;
a reflective device, said reflective device being mounted inside said housing and reflecting light from the front sector of said housing;
an imaging module positioned within said housing to capture an image from said front sector of the housing;
at least one high intensity infrared diode, said diode being installed into said housing from the rear sector of said housing and positioned to emit infrared light from the front sector of said housing;
at least one visible light source, said visible light source being installed within said housing from the rear sector of said housing such that said visible light source projects through said reflectors and emits light from the front sector of said housing;
at least one lens affixed to the front sector of said housing through which at least one of emitted visible and infrared light passes;
a high power infrared laser within the housing; and
a laser aperture opening at the front sector of the housing.

6. The multi-mode lighthead according to claim 5, wherein said high power infrared laser is approximately 50 mW or greater and operates at approximately 780 nm or greater.

7. A multi-mode lighthead, comprising:
a housing having front, rear, top, and bottom sectors;
an imaging module positioned within said housing to capture an image from said front sector of the housing;
at least one high intensity infrared diode, said diode being installed into said housing from the rear sector of said housing and positioned to emit infrared light from the front sector of said housing;
at least one visible light source, said visible light source being installed within said housing from the rear sector of said housing such that said visible light source projects through said reflectors and emits light from the front sector of said housing; and
a plurality of openings formed within said rear sector of said housing and extending between said front and rear sectors, wherein said diode and said visible light source extend through said openings and are operatively secured to said housing at said rear sector of said housing.

8. A multi-mode lighthead, comprising:
a housing having front, rear, top, and bottom sectors;
an imaging module positioned within said housing to capture an image from said front sector of the housing;
at least one high intensity infrared diode, said diode being installed into said housing from the rear sector of said housing and positioned to emit infrared light from the front sector of said housing; and
at least one visible light source, said visible light source being installed within said housing from the rear sector of said housing such that said visible light source projects through said reflectors and emits light from the front sector of said housing;
a high power infrared laser within the housing; and
a laser aperture opening at the front sector of the housing.

9. The multi-mode lighthead according to claim 8, wherein said high power infrared laser is approximately 50 mW or greater and operates at approximately 780 nm or greater.

10. A multi-mode lighthead, comprising:
a housing having front, rear, top, and bottom sectors;
a high power infrared laser within the housing;
a laser aperture opening at the front sector of the housing;
at least one high intensity infrared diode, said diode being installed into said housing from the rear sector of said housing and positioned to emit infrared light from the front sector of said housing; and
at least one visible light source, said visible light source being installed within said housing from the rear sector of said housing such that said visible light source emits light from the front sector of said housing.

11. The multi-mode lighthead according to claim 10, wherein said high power infrared laser is approximately 50 mW or greater and operates at approximately 780 nm or greater.

12. A multi-mode lighthead system, said system comprising:
a lighthead housing having front, rear, top, and bottom sectors;
an imaging module positioned within said housing to capture an image from said front sector of the housing;
a display for viewing and retaining the image from said imaging module;
a positioning and control system for positioning and controlling the lighthead housing;
an attachment portion connected with at least one of said sectors of said housing and interfacing with said positioning and control system;
at least one high intensity infrared diode, said diode being installed into said housing from the rear sector of said housing and positioned to emit infrared light from the front sector of said housing; and
at least one visible light source, said visible light source being installed within said housing from the rear sector of said housing such that said visible light source projects through reflectors and emits light from the front sector of said housing; and
a plurality of openings formed within said rear sector of said housing and extending between said front and rear sectors, wherein said diode and said visible light source extend through said openings and are operatively secured to said housing at said rear sector of said housing.

13. The multi-mode lighthead system according to claim 12, further comprising:
   a reflective device, said reflective device being mounted inside said housing and reflecting light from the front sector of said housing; and
   at least one lens affixed to the front sector of said housing through which at least one of emitted visible and infrared light passes.

14. A multi-mode lighthead system, said system comprising
   a lighthead housing having front, rear, top, and bottom sectors;
   a positioning and control system for positioning and controlling the lighthead housing;
   an attachment portion connected with at least one of said sectors of said housing and interfacing with said positioning and control system;
   a high power infrared laser;
   a laser aperture opening at the front sector of the housing;
   at least one high intensity infrared diode, said diode being installed into said housing from the rear sector of said housing and positioned to emit infrared light from the front sector of said housing; and
   at least one visible light source, said visible light source being installed within said housing from the rear sector of said housing such that said visible light source projects through said reflectors and emits light from the front sector of said housing.

15. The multi-mode lighthead system according to claim 14, further comprising:
   an imaging module positioned within said housing to capture an image from said front sector of the housing; and
   a display for viewing and retaining the image from said imaging module.

16. The multi-mode lighthead system according to claim 14, further comprising:
   an insulated infrared laser housing; and
   an optical slip ring assembly, said optical slip ring assembly including fiber optics, a lens device, a stationary portion and a rotating portion, wherein said infrared laser is positioned exterior to said housing of said lighthead.

17. The multi-mode lighthead system according to claim 14, wherein said infrared laser is positioned within said housing, is approximately 50 mW or greater, and operates at approximately 780 nm or greater.

18. A multi-mode lighthead system, said system comprising:
   a lighthead housing having front, rear, top, and bottom sectors;
   a positioning and control system operatively connected to said lighthead housing for positioning and controlling the lighthead housing;
   an attachment portion connected with at least one of said sectors of said housing and interfacing with said positioning and control system;
   at least one of a high intensity infrared diode, said diode being installed into said housing from the rear sector of said housing and positioned to emit infrared light from the front sector of said housing, a visible light source, said visible light source being installed within said housing from the rear sector of said housing such that said visible light source emits light from the front sector of said housing, a high power infrared laser having a laser aperture opening at the front sector of the housing and operating at approximately 780 nm or greater, and an imaging module within said front sector of the housing for capturing an image; and
   a searchlight controller operatively connected to said positioning and control system for controlling an acquisition and fixed-position tracking of a target, said searchlight controller including absolute position sensing capability and a rangefinder accepting position data from a (GPS) Global Positioning System for tracking an absolute location of the target.

19. The multi-mode system according to claim 18, further comprising:
   a first power driver circuit motor;
   a right/left motor,
   a second power driver circuit motor;
   an extend/retract motor;
   a first and second gear assembly, respectively; and
   an output shaft for controlling the absolute position sensing of the searchlight via the searchlight controller.

20. The multi-mode system according to claim 18, further comprising an active feedback control for the lighthead in accordance with the position data to maintain the lighthead passing through a fixed, three-dimensional target in space.

21. A process for providing a multi-mode lighthead, comprising:
   providing a housing having front, rear, top, and bottom sectors;
   providing an imaging module within said housing to capture an image from said front sector of the housing;
   providing at least one high intensity infrared diode into said housing from the rear sector of said housing to emit infrared light from the front sector of said housing, wherein said at least one high intensity infrared diode is inserted into the housing from the rear sector of the housing and through an opening formed in the rear sector of the housing;
   providing at least one visible light source within said housing from the rear sector of said housing such that said visible light source projects through said reflectors and visible light is emitted from the front sector of said housing, wherein said at least one visible light source is inserted into the housing from the rear sector of the housing and through an opening formed in the rear sector of the housing; and
   providing a positioning and control system for said lighthead, said positioning and control system controlling a position of said housing.

22. The process according to claim 21, further comprising:
   locating inside said housing a reflective device for reflecting light from the front sector of said housing;
   providing at least one lens at the front sector of said housing through which one of emitted visible and infrared light passes.

23. The process according to claim 21, further comprising:
   providing a heat dissipation device for carrying away heat generated by at least one of said visible light source, said infrared diode, and said imaging module; and providing an electrical power control circuit for controlling an electrical power source applied to said lighthead.

24. A process for providing a multi-mode lighthead, comprising:

providing a housing having front, rear, top, and bottom sectors;

providing an advanced navigational and visual aid, wherein said advanced navigational and visual aid is at least one of an imaging module within said housing to capture an image from said front sector of the housing and a high power infrared laser operating at approximately 780 nm or greater;

providing at least one high intensity infrared diode into said housing from the rear sector of said housing to emit infrared light from the front sector of said housing, wherein said at least one high intensity infrared diode is inserted into the housing from the rear sector of the housing and through an opening formed in the rear sector of the housing;

providing at least one visible light source within said housing from the rear sector of said housing such that said visible light source projects through said reflectors and visible light is emitted from the front sector of said housing, wherein said at least one visible light source is inserted into the housing from the rear sector of the housing and through an opening formed in the rear sector of the housing; and providing a positioning and control system for said lighthead, said positioning and control system controlling a position of said housing.

* * * * *